United States Patent [19]

Yokota et al.

[11] Patent Number: 5,110,328
[45] Date of Patent: May 5, 1992

[54] SOLVENT ADSORBER AND SOLVENT RECOVERY SYSTEM

[75] Inventors: Hisaaki Yokota, Chigasaki; Tadashi Yoshiguchi; Hitoshi Kamimatsuse, both of Kamakura, all of Japan

[73] Assignee: Kabushiki Kaisha Kobe Seiko Sho, Kobe, Japan

[21] Appl. No.: 533,413

[22] Filed: Jun. 5, 1990

[30] Foreign Application Priority Data

Jun. 7, 1989 [JP] Japan .................. 1-144987
Dec. 20, 1989 [JP] Japan .................. 1-146718
Mar. 20, 1990 [JP] Japan .................. 2-70050

[51] Int. Cl.$^5$ .............................. B01D 53/04
[52] U.S. Cl. ........................ 55/180; 55/208; 55/387
[58] Field of Search ............ 55/179, 180, 208, 387

[56] References Cited

U.S. PATENT DOCUMENTS

| | | | |
|---|---|---|---|
| 1,912,784 | 6/1933 | Miller et al. | 55/208 X |
| 2,379,321 | 6/1945 | Sutcliffe et al. | 55/180 |
| 2,519,296 | 8/1950 | Simpson | 55/208 X |
| 2,974,747 | 3/1961 | Coolidge, Jr. et al. | 55/179 X |
| 3,296,773 | 1/1967 | Hemstreet | 55/208 X |
| 3,309,844 | 3/1967 | Hemstreet et al. | 55/208 X |
| 3,594,990 | 7/1971 | Hawley | 55/208 X |
| 4,282,015 | 8/1981 | Bartoschek et al. | 55/179 |
| 4,289,505 | 9/1981 | Hardison et al. | 55/180 X |
| 4,414,003 | 11/1983 | Blaudszun | 55/179 X |
| 4,536,197 | 8/1985 | Cook | 55/180 X |
| 4,581,049 | 4/1986 | Januschkowetz | 55/208 |
| 4,598,686 | 7/1986 | Lupoli et al. | 55/208 X |
| 4,599,095 | 7/1986 | Barnes et al. | 55/208 |
| 4,738,694 | 4/1988 | Godino et al. | 55/179 X |
| 4,846,852 | 7/1989 | Schweitzer et al. | 55/180 X |
| 4,859,216 | 8/1989 | Fritsch | 55/180 X |
| 4,930,294 | 6/1990 | Meier | 55/180 |
| 4,963,168 | 10/1990 | Spencer | 55/180 |

FOREIGN PATENT DOCUMENTS

| | | | |
|---|---|---|---|
| 3139781 | 4/1983 | Fed. Rep. of Germany | 55/180 |
| 50-106905 | 3/1977 | Japan | 55/180 |
| 55-061918 | 5/1980 | Japan | 55/179 |
| 55-092122 | 7/1980 | Japan | 55/179 |
| 56-010319 | 2/1981 | Japan | 55/180 |
| 59-177119 | 10/1984 | Japan | 55/208 |
| 61-174923 | 8/1986 | Japan . | |
| 63-151335 | 6/1988 | Japan | 55/179 |
| 1-189320 | 7/1989 | Japan | 55/208 |
| 0955990 | 9/1982 | U.S.S.R. | 55/179 |

*Primary Examiner*—Robert Spitzer
*Attorney, Agent, or Firm*—Oblon, Spivak, McClelland, Maier & Neustadt

[57] ABSTRACT

A solvent adsorber includes a plural number of adsorbent material units of molded honeycomb structure with sheet heaters interposed between the respective units. The sheet heaters generate heat upon current supply to heat up the adsorbent material. As a result, the adsorbent material releases the adsorbed solvent therefrom. A solvent recovery system is used to pass solvent-containing gas through the solvent adsorber in a first main adsorption tower to obtain a clean gas which has been stripped of the solvent by adsorption on the adsorber. In a second main adsorption tower with a similar adsorber, current is supplied to the sheet heaters to release the solvent from the adsorber and at the same time the tower is evacuated to draw out a concentrated solvent gas. The concentrated solvent gas from the second main adsorption tower is sent to a condenser to condense and collect the solvent in liquefied form. In this system, the adsorber in each adsorption tower is regenerated in dry state, obviating the use of steam.

14 Claims, 8 Drawing Sheets

HEATING OR COOLING MEDIUM

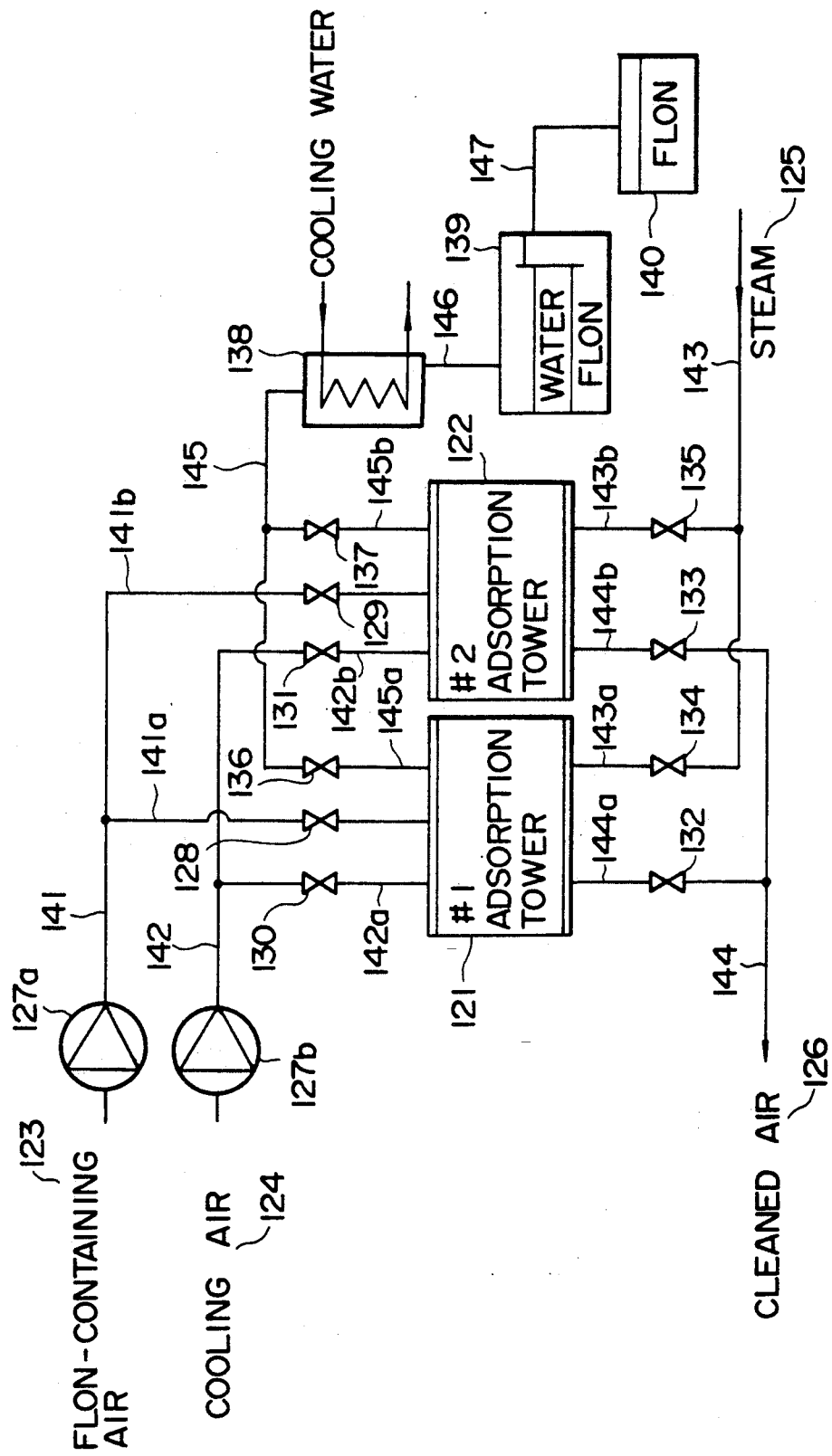

SOLVENT ADSORBER AND SOLVENT RECOVERY SYSTEM

BACKGROUND OF THE INVENTION

1. Field of the Invention

This invention relates to a solvent adsorber and a batch type solvent recovery system for recovering solvent from solvent-containing gases by the use of such a solvent adsorber, and more particularly to solvent recovering techniques which obviate the use of steam in the regenerating stage. The present invention can be suitably applied to removal and recovery of FREON type solvents such as chlorofluorocarbon (CFC), hydrogen chlorofluorocarbon (HCFC), and fluorocarbon (FC); chloric solvents such as methylene chloride, 1-1-1 trichloroethylene, perchloroethylene, and trichloroethylene; and organic solvents such as toluene, xylene, benzene and alcohol.

2. Description of the Prior Art

Recently, environmental pollution has become a matter of great concern, with a trend of prohibiting the release of carbonaceous waste into the atmosphere by tightening related regulations from the standpoint of conservation of the environment. Above all, atmospheric pollution with FREON gases containing chlorides or with chloric solvents has become a serious problem on a global scale, urging restrictions on the production of FREON gases or the like. With regard to the restriction of the FREON gas production, although the total prohibition of use might be called for in the future, what is considered to be the best measure at the present stage or until development of a suitable replacement is to resort to a closed system which is adapted to recover and reuse a FREON gas which has thus far been released into the atmosphere in case of prior art systems. For this purpose, there have been proposed and used various types of solvent recovery systems.

Shown in FIG. 10 in a block diagram is a conventional batch type solvent recovery system, which can be employed for recovering various industrial solvents in addition to FREONs or other chloric solvents under different conditions. Here, for the convenience of explanation, the system is regarded as a recovery system for FREON, a representative one among various chlorinated hydrocarbon gases. Namely, the FREON recovery system is provided with first and second adsorption towers 121 and 122 in which batchwise adsorption and desorption or release of FREON gas are alternately repeated to recover FREON gas continuously therefrom. These adsorption towers 121 and 122 are packed with FREON adsorbent like activated carbon.

FREON containing air is introduced into the adsorption towers 121 and 122 by a blower 127a through a pipe 141 and its branch pipes (141a and 141b) which are provided with on-off valves 128 and 129, respectively. These on-off valves 128 and 129 control the flow of FREON-containing air to be supplied to the adsorption towers 121 and 122, respectively. Cooling air is also supplied to the adsorption towers 121 and 122 by a blower 127b through a pipe 142 and its branch pipes (142a and 142b). These pipes 142a and 142b are provided with on-off valves 130 and 131 which control the flow of cooling air to the adsorption towers 121 and 122, respectively.

Steam 125, is supplied to the adsorption towers 121 and 122 through branch pipes 143a and 143b of piping 143, which are provided with on-off valves 134 and 135 to control the supply of regenerating steam to the adsorbent in the adsorption towers 121 and 122, respectively.

On the other hand, pipes 144a and 144b which are connected to the gas outlets of the adsorption towers 121 and 122 are jointly connected to a pipe 144. On-off valves 132 and 133 are inserted in the pipes 144a and 144b to control the flow of cleaned air from the adsorption towers 121 and 122, respectively. Cleaned air is released to the atmosphere through the pipe 144.

Pipes 145a and 145b which are connected to the other gas outlets of the adsorption towers 121 and 122 are jointly connected to a pipe 145. On-off valves 126 and 137 are inserted in the pipes 145a and 145b to control the discharge of post-regeneration gas from the adsorption towers 121 and 122, respectively. The pipe 145 is connected to a condenser 138 which is supplied with cooling water to condense the post-regeneration gas. The resulting liquid is fed to water separator 139 through a pipe 146 to separate water from liquid FREON. This liquefied FREON is sent to and stored in a storage tank 140 through a pipe 147.

The above-described batch type FREON gas recovery system operates in the manner as follows.

Firstly, let us assume that the recovery system is now in a phase of operation where the adsorbent packed in the first adsorption tower 121 has been regenerated into activated state while the adsorbent in the second adsorption tower 122 has been fully laden with adsorbed FREON in that case, the on-off valves 128 and 132 are open, the on-off valves 129 and 133 are closed, the on-off valves 130 and 131 are closed, the on-off valves 134 and 136 are closed, and the on-off valves 135 and 137 are open. Under these conditions, FREON containing air 123 is fed to the adsorption tower 121 by the blower 127a through the pipe 141a, and stripped of FREON by adsorption as it is passed through the adsorbent in the tower 121. Resulting cleaned air 126 is discharged from the adsorption tower 121 through the pipe 144a.

On the other hand, steam 125 is supplied to the second adsorption tower 122 through pipe 143b and passed through the adsorbent in the second tower 122, whereupon FREON and water which were adsorbed on the adsorbent in a previous adsorption stage are heated and released from the adsorbent by the energy of steam. Released FREON and water are sent to the condenser 138 together with steam and cooled there. As a result, the FREON gas and water are liquified to form a mixture liquid of FREON and water, which is then sent to the water separator 139 to separate water from liquid FREON. The resulting liquid FREON is collected in the storage tank 140.

Nextly, after a lapse of a predetermined time, the on-off valves 135 and 137 are closed to end the desorption stage of the second desorption tower 122 while continuedly hoding the first adsorption tower in the adsorption stage with the on-off valves 128 and 132 in open state. Then, the on-off valves 131 and 133 are opened to supply the adsorption tower 122 with cooling air which is almost or completely free of FREON. The cooling air is passed through the adsorbent in the adsorption tower 122 to dry and cool off the adsorbent of activated carbon or the like which was moistened with steam in a previous desorption stage. The spent cooling gas fromthe adsorption tower 122 is released into the atmosphere together with cleaned air through pipes 144b and 144.

Upon a lapse of a predetermined time, the on/off valves 129, 134 and 136 are opened, and the on-off valves 128 and 132 are closed, holding the on-off valve 133 in open state and the on-off valves 130, 135 and 137 in closed state.

As a result, the FREON-containing air 123 is passed through the adsorbent in the second adsorption tower 122 for the FREON adsorption, while steam is passed through the adsorbent in the first adsorption tower 121 for FREON desorption. The exhaust gas which contains a FREON and moisture is sent to the condenser 138 and water separator 139 to recover the FREON therefrom.

After a lapse of predetermined time, the on-off valves 134 and 136 are closed and the on/off valves 130 and 132 are opened to supply cooling air 124 to the first adsorption tower 121. Accordingly, after the desorption stage, the first adsorption tower 121 proceeds to a cooling (drying) stage.

In this manner, a liquid FREON is recovered from FREON-containing air 123 by a cycle of operation consisting of adsorption, desorption and cooling stages which are established by switching the respective on-off valves. While the first adsorption tower 121 is in the adsorption stage, the second adsorption tower 122 is put in operation of the desorption and cooling stages; and while the second adsorption tower 122 is in the adsorption stage, the first adsorption tower 121 is put in operation of the desorption and cooling stages. Consequently, FREON gas can be continuously recovered from exhaust air. Where the continuous recovery of FREON is not a mandatory requisite, the adsorption, desorption and cooling stages may be conducted at certain time intervals by the use of a single adsorption tower. In a case where the operating time of the adsorption stage does not conform with the combined operating time of the desorption and cooling stages, there may be provided three or more adsorption towers.

Heretofore, activated carbon in the form of pellets or of granular or fibrous form has been used in the batch type FREON gas recovery system as described above (Japanese Laid-Open Patent Application 61-174923). More specifically, it has been the general practice to adsorb FREON on activated carbon py passing FREON containing gas through activated carbon particles having a grain size of 0.5–10 mm or through felt of fine activated carbon fiber, without using an adsorbent material in the shape of a molded monolithic structure.

In this regard, there has been a problem that generation of acids is unavoidable in the stream desorption process where chloride-containing organic solvents like FREON are desorbed with steam. Namely, although the FREON is an extremely stable substance which is mainly composed of carbon, chlorine and fluorine, the adsorbed FREON on activated carbon partly decomposes if exposed to steam for a long time period. Therefore, repeated recovery and reuse of FREON under such conditions will invite degradations in purity of the recovered FREON and increases in acid concentration to such a degree as to make the recovery system practically incapable to serve for the intended purpose. Besides, the entrainment of acids in exhaust water or in cleaned gas might cause secondary pollution.

Further, when recovering a chloric solvent which contains a large quantity of carcinogenic substance as a stabilizer, it becomes necessary to provide additional equipment for waste water treatment to prevent environmental pollution by a water-soluble stabilizer component which dissolves into water and might otherwise be mostly discharged together with waste water or by a chloric solvent component which might dissolve into waste water as a result of contact of the solvent with steam.

Furthermore, in a case where steam is employed as a regenerating gas, there has to be additionally provided piping for steam and a steam boiler. Thus, such solvent recovery system increase the necessary equipment, maintenance and running costs. Besides, the steam desorption process in which basically water remains on the surface of the adsorbent needs to provide a drying stage to remove moisture from the adsorbent surface prior to an ensuing adsorption stage. However, due to insufficient drying of the adsorbent, the prior art recovery system fails to use its originally designed adsorption capacity to its full extent and therefore requires an objectionably large amount of adsorbent.

For the reasons stated above, the prior art solvent recovery system which uses steam has a number of drawbacks which are related with water.

SUMMARY OF THE INVENTION

It is an object of the present invention to provide a solvent recovery system which employs hot air in place of steam to regenerate the adsorbent in dry state, simplifying the treatment of waste water and preventing production of acids while improving the quality of organic FREON or other solvents to be recovered.

It is another object of the invention to provide a solvent adsorber incorporating a molded structure of an adsorbent material suitable for use in the above-mentioned solvent recovery system.

In accordance with the present invention, there is provided a solvent adsorber which is composed of an adsorbent material in the shape of a molded monolithic structure containing gas passages to adsorb a solvent from a solvent-containing gas flowing through the gas passages, and a heat supply member held in contact with or bonded to the adsorbent material to transfer heat to the latter mainly through heat conduction.

According to the invention, there is also provided a solvent recovery system which essentially includes: at least one main adsorption tower accommodating the above-defined adsorber; a gas feed means for forcibly passing a solvent-containing gas through the main adsorption tower to obtain a cleaned gas by adsorption of the solvent on the adsorbent material in the main tower; an evacuating means for drawing out of the main desorption tower a concentrated solvent gas containing the solvent desorbed from the adsorbent; a condensing means for condensing the solvent out of the concentrated solvent gas by cooling the same; and a control means for selectively switching the operation between an adsorption stage in which a solvent-containing gas is passed through the main adsorption tower to absorb the solvent on the adsorbent material and a desorption stage in which the solvent is released from the adsorbent material by heating same by the heat supply member while evacuating the main desorption tower by the evacuating means.

The solvent adsorber according to the invention consists of an adsorbent material which contains activated carbon of excellent solvent adsorptivity and heat conductivity as a major component and which is in the form of a molded monolithic structure containing a multitude of pores. Preferably, the molded adsorbent material is of a honeycomb structure, and the heat supply member is held in contact with or bonded to the adsorbent material.

The solvent is adsorbed on activated carbon as it is selectively captured in micropores of particular sizes which exist in the activated carbon, and released upon supplying heat to the adsorbent while holding the adsorbent in a reduced pressure atmosphere to lower the partial pressure of the steam.

The solvent adsorber according to the invention is directly heated by the heat supply member to release the solvent therefrom without using steam which has thus far been resorted to for the solvent desorption. In this instance, the heat supply member is held in contact with or bonded to the adsorbent material to heat the latter directly and immediately. On the other hand, the adsorbent material is molded into a monolithic shape to ensure that the heat energy from the heat supply member act on the adsorbent effectively in a prompt manner. For the sake of easy and efficient gas passage through the adsorbent, the molded monolithic adsorbent material is preferred to be in the form of a honeycomb structure.

In a case where the heat supply member is in the form of a heat exchanger having a heat medium circulated at least in part of its body, the adsorbent material can be heated by circulating the heat medium through the heat supply member by the use of a heat medium feed means. In such a case, the heat medium feed means may be arranged to feed selectively the above-mentioned heat medium or a cooling medium for playing a role of cooling the adsorbent in addition to the heating. The adsorbent is heated to desorb the solvent as mentioned hereinbefore, but a lower adsorbent temperature gives a higher adsorption efficiency in the adsorption stage of the next cycle. This is because the molecular kinetic level of the solvent to be adsorbed drops at lower temperatures, improving the adsorptive action and capacity of the activated carbon which is the dominant component of the adsorbent.

Examples of the afore-mentioned heat medium include steam, heated water, heated oil, heated liquid FREON and the like. Examples of the cooling medium include cooling water, chill water, cooling oil, cooling liquid FREON and the like.

The present invention can be suitably applied to removal and recovery of FREON type solvents such as chlorofluorocarbon (CFC), hydrogen chlorofluorocarbon (HCFC) and fluorocarbon (FC), chloric solvents such as methylene chloride, 1-1-1 trichloroethylene, perchloroethylene and trichloroethylene, and organic solvents such as toluene, xylene, benzene and alcohol.

On the other hand, in the solvent recovery system according to the invention, firstly a solvent-containing gas is passed through the main adsorption tower by the gas feed means. By so doing, a clean gas is obtained as a result of adsorption of the solvent on the adsorbent in the main adsorption tower.

Nextly, the feed of the solvent-containing gas is stopped before the adsorbent reaches a saturating point in its adsorption capacity, instead the adsorbent is heated through the heat supply member. Namely, the adsorbent is heated by conducting current through the heat supply member when it is in the form of a sheet-like heater, or by passing a heat medium through the heat supply member when it is in the form of a heat exchanger. Simultaneously with the heating of the adsorbent, the main adsorption tower is exhausted by the exhaust means. Consequently, the solvent is released from the adsorbent in the main adsorption tower, and the resulting concentrated solvent gas which contains the solvent in high concentration is led to and cooled in the condensing means to condense and recover the solvent in liquid form.

According to the present invention, the FREON adsorption and desorption are effected by heating and/or cooling an adsorbent which has a high adsorption capacity for solvents as represented by FREONS and which has a monolithic structure formed of activated carbon of excellent heat conductivity, eliminating the various problems of the steam desorption process in which the adsorbent is directly contacted with steam in the stage of FREON desorption (adsorbent regeneration). Besides, since the main adsorption tower is evacuated at the time of desorption (regeneration) in the present invention, a lower adsorbent heating temperature may be employed to reduce the energy which is required for the regeneration. In case a solvent adsorbent with heating and cooling functions is used, it becomes possible to provide an extremely efficient solvent recovery system by selecting temperature and pressure swings optimum for the adsorption and desorption of the solvent.

In recovery system which is provided with auxiliary adsorption towers in addition to main adsorption towers as will be described hereinlater, the solvent in a solvent-containing feed gas is removed therefrom by adsorption in the adsorption stage of the main tower, drawing out an exhaust gas (a medium concentration gas), which contains the solvent in a concentrated form, in the desorption stage. Concurrently, an uncondensed solvent gas, containing the solvent which remained uncondensed in the condensing cooling means, is introduced into an auxiliary adsorption tower to remove a major part of the uncondensed solvent. Therefore, according to the invention, even if the feed gas which is supplied from outside the system contains a solvent in a low concentration and a relatively large quantity of the solvent is discharged in uncondensed state from the cooler condenser means without undergoing condensation to a sufficient degree in the condensing cooling means, the uncondensed solvent can be removed sufficiently in the auxiliary adsorption tower. In this connection, if a quasi-cleaned exhaust gas from the auxiliary adsorption tower were returned to the inlet of the main adsorption tower, the latter could be effectively used for the solvent concentration through adsorption and desorption of the feed gas introduced from outside the system, since the amount and concentration of the solvent in the returned gas are low. It follows that the solvent-containing gas can be concentrated with an extremely high efficiency in the main adsorption tower, permitting to operate with a reduced amount of adsorbent in the main adsorption tower and to cut the operation cost.

The above and other objects, features and advantages of the invention will become apparent from the following description and the appended claims, taken in conjunction with the accompanying drawings which show by way of example preferred embodiments of the invention.

BRIEF DESCRIPTION OF THE DRAWINGS

In the accompanying drawings:

FIG. 10 is a block diagram of a conventional solvent recovery system.

DESCRIPTION OF PREFERRED EMBODIMENTS

Now, the invention is described more particularly with reference to the accompanying drawings.

Figure 1:
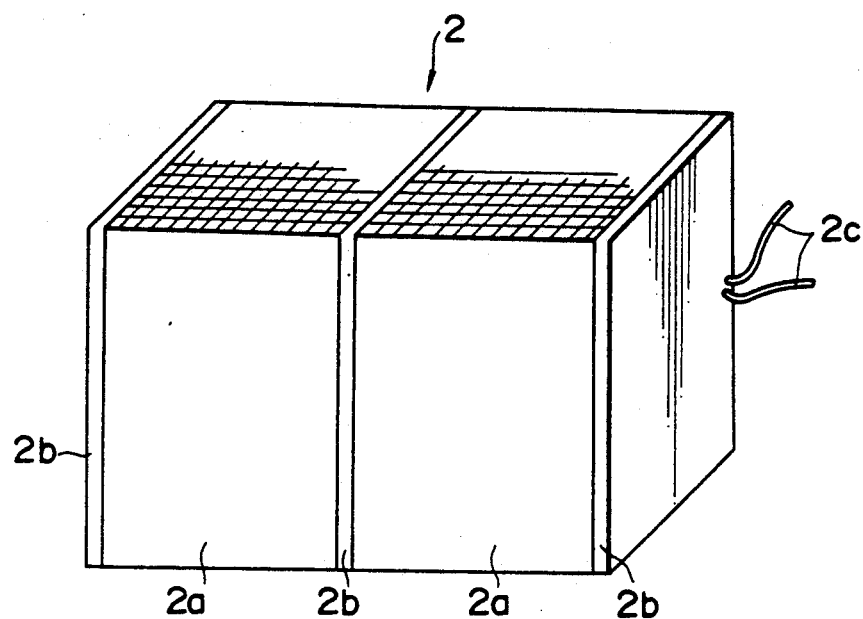
FIG. 1 is a schematic perspective view of a solvent adsorbent according to the present invention.

Referring to FIG. 1, there is shown in a perspective view an adsorber 2 employed in a solvent recovery system in the first embodiment of the invention. The adsorber 2 is formed of an adsorbent material 2a which is molded into a rectangular monolithic honeycomb structure. A number of units of this adsorbent material 2a are connected end to end (two such connected units are shown in FIG. 1) to form the adsorber 2, through resistance type sheet heaters 2b which are bonded to the opposite ends of each one of the connected adsorbent units 2a to generate heat upon applying current thereto. Lead wires 2c are connected to each sheet heater 2b for this purpose. A thermocouple (not shown) is inserted in the adsorbent material 2a to measure its temperature, controlling the power supply to the sheet heater 2b in such a manner as to hold the adsorbent material 2a at a predetermined temperature.

As the sheet heater 2b, there may be employed, for example, a thin sheet type heater of 1 mm in thickness, 130 mm in width and 400 mm in length, which has a capacitance of 430 W at AC 100 V. In a case where the adsorbent units of corresponding dimensions are sandwiched between eight sheet heaters of this size, for instance, there is obtained an adsorber 2 having a width of 120 mm, a length of 240 mm and a height of 400 mm. The width (130 mm) of the sheet heater 2b is larger than the width (120 mm) of the adsorber 2 because the end portions of the sheet heater 2b which have a low calorific value need to be protruded beyond the end portions of the adsorbent material.

With the thus assembled adsorber 2, the resistance sheet heaters 2b generate heat upon supplying current thereto through the lead wires 2c, transmitting the heat to the respective adsorbent material 2a, whereupon the heated adsorbent material 2a releases a FREON which has been adsorbed thereon.

Figure 2:
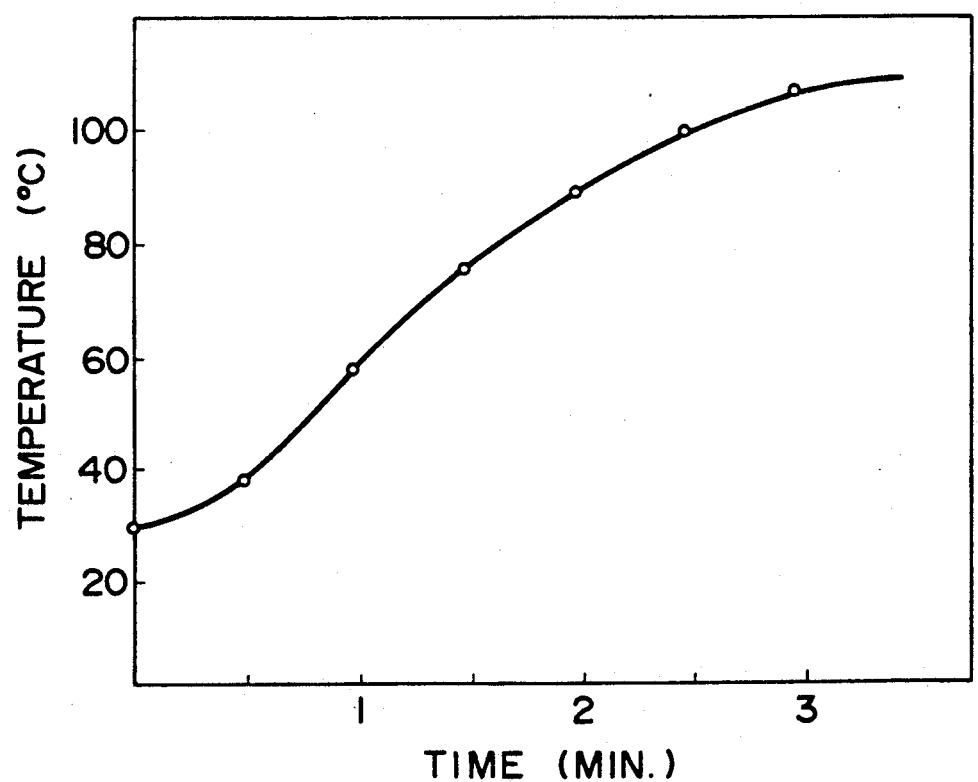
FIG. 2 is a diagram of adsorbent heat-up characteristics.

The diagram of FIG. 2 shows the adsorbent heating characteristics plotted against the time on the horizontal axis and the temperature on the vertical axis. As seen in FIG. 2, the adsorbent material 2a is immediately heated up as soon as current is supplied to the sheet heater 2b.

Figure 3:
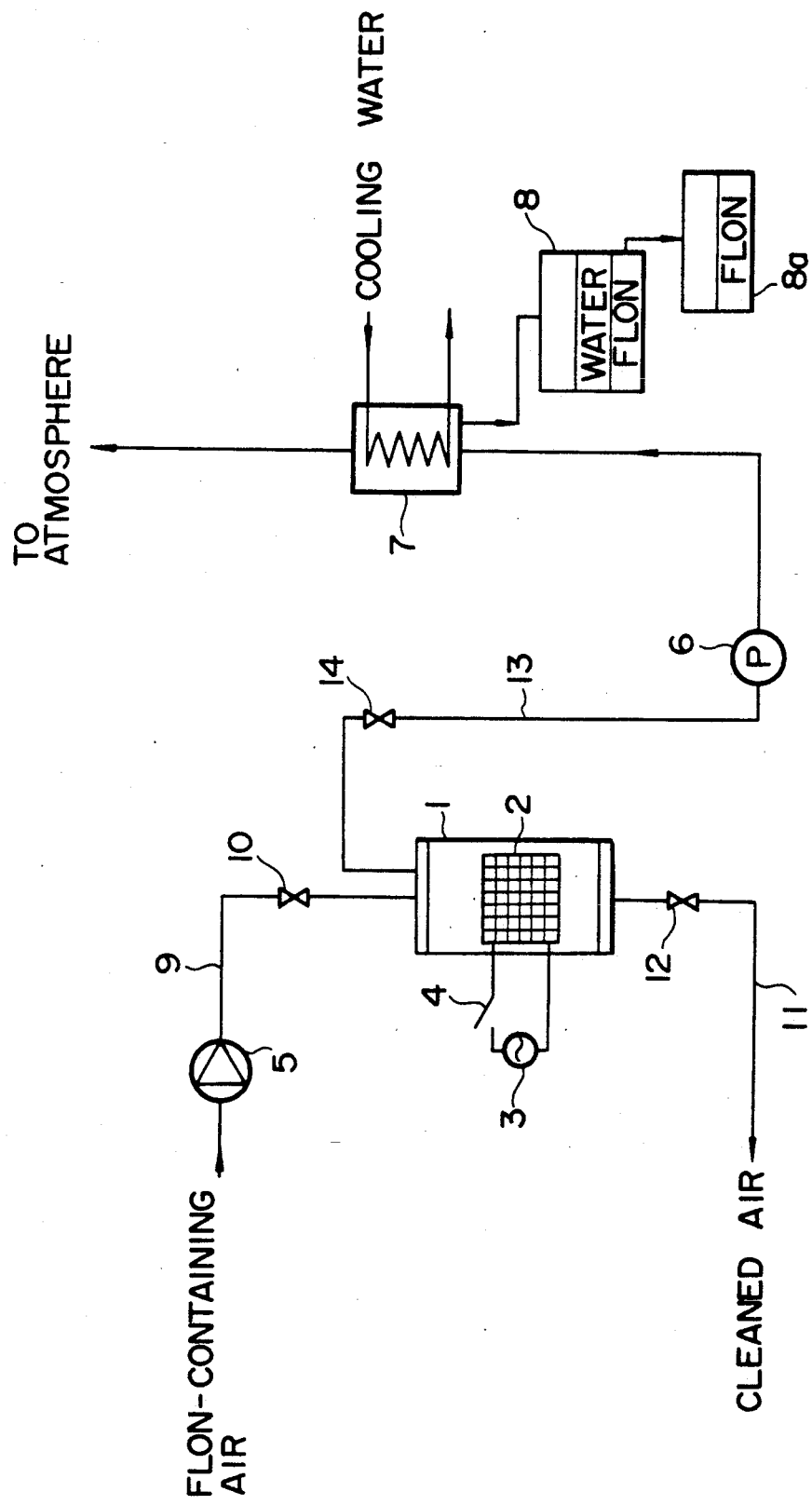
FIG. 3 is a block diagram of a solvent recovery system in a first preferred embodiment of the invention.

FIG. 3 is a block diagram of a solvent recovery system embodying the invention, which is applied to the recovery of a FREON, such as F-113.

This system includes a main adsorption tower 1 in which the above-described adsorbent body 2 is accommodated. The sheet heaters 2b of the adsorbent body 2 are connected to a power supply 3, and a switch 4 is inserted between the adsorbent body 2 and the power supply 3. Upon closing the switch 4, current is applied to a heat supply member held in contact with or bonded to the adsorbent body 2 from the power supply 3 to generate heat by resistance and to transmit heat to the adsorbent body 2 mainly through heat conduction.

FREON containing air is supplied to the main adsorption tower 1 through a pipe 9, and passed through the adsorber 2 in the tower 1, stripping the FREON from the feed air by adsorption on the adsorber 2. The resulting cleaned air from the main adsorption tower 1 is released into the atmosphere through a pipe 11. A blower 5 is inserted in the pipe 9 to introduce the FREON-containing air into the main adsorption tower 1, and on-off valves 10 and 12 are inserted in the pipes 9 and 11 to control the flow of feed and discharge gases to and from the main adsorption tower 1.

A pipe 13 is connected to the gas outlet of the main adsorption tower 1, through which pipe 13 the exhaust gas from the main adsorption tower 1 is sent to a condenser 7 by the action of a vacuum pump 6. Namely, the exhaust gas of the main adsorption tower 1 is sent to the condenser 7 by the action of the vacuum pump 6 which evacuates the main tower 1. The pipe 13 is provided with an on-off valve 14 which controls the evacuation of the main adsorption tower 1.

Cooling water is circulated through the condenser 7 to cool off the exhaust gas which has been sent to the condenser 7, condensing the FREON and moisture contents of the gas into liquids. This liquid mixture is sent to a separator 8 thereby to separate liquid FREON from the mixture. The separated liquid FREON is collected and stored in a storage tank 8a.

In the FREON recovery system of the above-described arrangement, FREON-containing air is first fed to the main adsorption tower 1 with the on-off valves 10 and 12 in open state and the on-off valve 14 in closed state. The switch 4 is off at this time. Consequently, the FREON in the feed air is adsorbed on the adsorbent material 2a of normal temperature, and clean air which has been stripped of FREON is discharged from the main adsorption tower 1 and released into the atmosphere through the pipe 11.

After a lapse of a predetermined time or when or immediately before a time point when the adsorbent material 2a of honeycomb structure reaches a point of saturation in adsorption capacity, the on-off valve 10 is closed to stop the feed of the FREON-containing air. At the same time the on-off valve 12 is closed and opening the on-off valve 14 is opened. Next, the switch 4 is turned on to supply power to the sheet heaters 2b of the adsorber 2 to heat them up to a predetermined temperature through resistance heating. The heat of the sheet heater 2b is transmitted to the adsorbent material 2a, heating the latter to release the FREON which was adsorbed in the previous adsorption stage. The air in the main adsorption tower 1 which contains the released FREON in a high concentration is drawn out by the pump 6 and sent to the condenser 7 where the exhaust gas from the main adsorption tower 1 is cooled to condense the FREON and moisture contents into liquids.

The resulting liquid mixture is sent to the separator 8 to separate liquid FREON from the FREON, collecting the separated liquid mixture in the tank 8a.

Nextly, after a lapse of a predetermined time or upon completion of the desorption stage, the on-off valves 10 and 12 are opened, and the on-off valve 14 is closed to proceed to the adsorption stage again. In this manner, the adsorption and desorption stages are carried out alternately to recover the FREON from the feed air.

Since this embodiment uses no steam for desorption of the FREON in the regenerative treatment, it can eliminate the various drawbacks or problems which are encountered in the conventional recovery systems as a result of the use of steam. In addition, the FREON adsorber 2 according to the present invention can be promptly heated up as soon as current is supplied to the sheet heaters 2b without inviting degradations in operating efficiency. Further, in contrast to the steam process where the adsorbent is heated for regeneration to about 100° C. by introduction of steam, the adsorbent heating temperature in this embodiment suffices to be as low as about 80° C. because the main adsorption tower 1 is concurrently evacuated by the vacuum pump 6 (the exhaust means). Therefore, the adsorbent requires less energy consumption.

Figure 4:
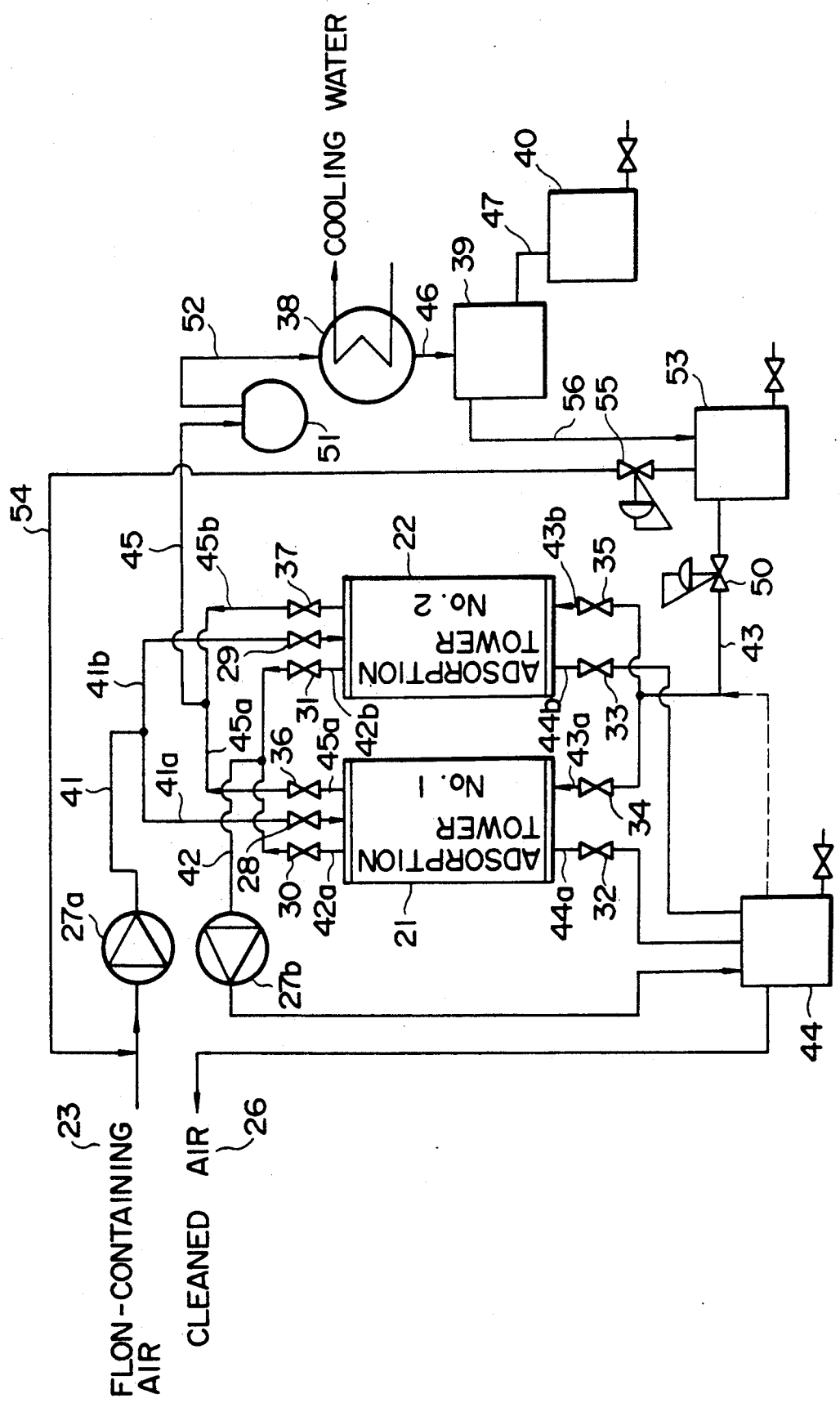
FIG. 4 is a block diagram of a solvent recovery system in a second preferred embodiment of the invention.

Illustrated in FIG. 4 in block diagram is a FREON gas recovery system in the second embodiment of the invention, which is provided with a couple of main adsorption towers, namely, a first main adsorption tower 21 and a second main adsorption tower 22. In this embodiment, the adsorption and desorption stages of the batchwise recovering process are alternately repeated in the two adsorption towers 21 and 22 to permit continuous FREON gas recovery. Each one of the main adsorption towers 21 and 22 receives therein an adsorber (not shown) which is of the same nature as in the foregoing first embodiment, similarly controlling the temperature of the adsorbent material by current supply to the sheet heaters.

FREON containing air 23 is supplied to the main adsorption towers 21 and 22 by a blower 27a through branch pipes (41a and 41b) of a pipe 41. The pipes 41a and 41b are provided with on-off valves 28 and 29 which control the supply of the FREON-containing air to the respective main adsorption towers 21 and 22.

Cooling air is drawn out of the main adsorption towers 21 and 22 by sucking action of a blower 27b through branch pipes (42a and 42b) of a pipe 42. The pipes 42a and 42b are provided with on-off valves 30 and 31 which control the suction of cooling air from the main adsorption towers 21 and 22, respectively.

A regenerating carrier gas is supplied to the main adsorption towers 21 and 22 through branch pipes (43a and 43b) of a pipe 43. The pipes 43a and 43b are provided with on-off valves 34 and 35 which control the supply of the carrier gas to the respective main adsorption towers. The pipe 43 is provided with a constant pressure valve 50 which is adapted to supply the regenerating carrier gas from outside the main adsorption towers to either the main tower 21 or 22 which has been evacuated to a pressure level lower than a predetermined value.

On the other hand, pipes 44a and 44b are connected to the gas outlets of the the main adsorption towers 21 and 22, respectively, the pipes 44a and 44b being jointly connected to an exhaust air tank 44. These pipes 44a and 44b are provided with on-off valves 32 and 33 which control the discharge of cleaned air 26 from the main adsorption towers 21 and 22, respectively. The cleaned air 26 is released into the atmosphere from the exhaust air tank 44.

Pipes 45a and 45b which are connected to another gas outlets of the main adsorption towers 21 and 22 are jointly connected to a pipe 45. These pipes 45a and 45b are provided with on-off valves 36 and 37 which control the discharge of post-regeneration gas from the towers 21 and 22, respectively. The pipe 45 is provided with a vacuum pump 51 thereby to draw the post-regeneration gas out of the respective adsorption towers 21 and 22. The discharge side of the vacuum pump 51 is connected through a pipe 52 to a condenser 38 where the post-regeneration gas is liquefied under the cooling effect of circulated cooling water. The resulting liquid is sent to a water separator 39 through a pipe 46 to separate water from the FREON. The water content in the liquid has origins in the moisture contents in the FREON-containing feed air and water-containing solvent. The liquefied FREON is sent to and stored in a storage tank 40 through a pipe 47. Uncondensed gas from the condenser 38 is collected in a recycle air tank 53 through the water separator 39 and returned to the inlet of the blower 27a through a pipe 54 to undergo the adsorption process again. Part of the uncondensed gas is sent to the pipe 43 to serve as a regenerating carrier gas. The pipe 54 is provided with a flow control valve 55 which prevents excessive supply of the recycle air.

The thus arranged FREON gas recovery system of this embodiment operates in the manner as follows.

Firstly, let us assume that the adsorbent in the first main adsorption tower 21 is now in a regenerated or activated state, and the adsorbent in the second main adsorption tower 22 carries adsorbed FREON substantially to its full adsorption capacity. At this time, the on-off valves 28 and 32 are open, the on-off valves 29 and 33 are closed, the on-off valves 30 and 31 are closed, the on-off valves 34 and 36 are closed, and the on-off valves 35 and 37 are open. Therefore, the FREON-containing feed gas 23 is introduced into the first main adsorption tower 21 by the blower 27a through the pipe 41a, and passed through the adsorber in the adsorption tower 21 to adsorb the FREON thereon. The cleaned air which has been stripped of the FREON is discharged through the pipe 44a and released into the atmosphere through the exhaust air tank 44.

On the other hand, the second main adsorption tower 22 is evacuated to a reduced pressure level by the vacuum pump 51 through the pipes 45b and 45. At the same time, power is supplied to the sheet heaters of the adsorbent in the second main adsorption tower 22 from a separately provided power supply to heat up the adsorbent to a predetermined temperature by resistance heating. The adsorbent temperature is measured by and controlled through a thermocouple which is embedded in the adsorbent in the second main tower 22 for temperature control. Consequently, the second main tower 22 is heated up promptly under reduced pressure to release the FREON. The resulting exhaust gas which contains the desorbed FREON in high concentration is sent to the condenser 38. Further, as soon as the second main adsorption tower 22 reaches a pressure level lower than a predetermined value as a result of evacuation by the vacuum pump 51, the gas in the recycle air tank 53 is supplied to the tower 22 as a regenerating carrier gas through the constant pressure valve 50 in the pipe 43 via pipes 43 and 43b to accelerate the regeneration of the adsorbent in the second adsorption tower 22.

The FREON gas which has been desorbed in this manner is condensed in the condenser 38 to liquefy its moisture and FREON contents, and, after separation of water at the separator 39, the liquefied FREON is collected in the storage tank 40. On the other hand, uncondensed gas components from the condenser 38 are led to the recycle air tank 53 through the separator 39 and pipe 56, and partly used as the afore-mentioned regenerating carrier gas. The remainder of the gas is returned to the inlet side of the FREON-containing gas blower 27a through the pipe 54 to undergo the recovery process again to suppress gas egression from the system to a minimum amount.

Nextly, after a lapse of a predetermined time, while holding the on-off valves 28 and 32 in open state to keep on the adsorption stage in the first main adsorption tower 21, the on-off valves 35 and 37 are closed to end the desorption stage in the second main adsorption tower 22. Then, the on-off valves 31 and 33 are opened to supply the second adsorption tower 22 with cooling air completely or almost free of FREON from the exhaust air tank 44, passing the cooling air through the adsorber of activated carbon or the like in the second tower 22 to cool off the adsorber which was heated in the previous desorption stage. The spent cooling gas discharged from the second adsorption tower 22 is sucked by the cooling blower 27b through the pipes 42b and 42 and returned to the exhaust air tank 44. Since the current supply to the adsorber in the second tower 22 is suspended during this cooling stage, the adsorber can be cooled to a temperature range where it regains the adsorptive function.

Then, after a lapse of a predetermined time, the on-off valves 29, 34 and 36 are opened, and the on-off valves 28, 32 and 31 are closed. The on-off valve 33 is kept in open state, and the on-off valves 30, 35 and 37 are kept in closed state.

As a consequence, the operation is shifted to a second phase where the FREON-containing feed air 23 is passed through the adsorber in the second adsorption tower 22 for FREON adsorption. On the other hand, the adsorber in the first adsorption tower 21 is heated by current conduction to release adsorbed FREON therefrom. The resulting desorption exhaust gas which contains FREON and moisture is sent to the condenser 38 and the water separator to recover the liquefied FREON.

In the next place, after a lapse of a predetermined time, the on-off valves 34 and 36 are closed, and the on-off valves 30 and 32 are opened to supply cooling air to the first adsorption tower 21. As a result, the operation of the first adsorption tower is shifted to a cooling stage from the desorption stage.

In this manner, the respective valves are switched on and off to shift each adsorption tower from an adsorption stage to a desorption stage and then to a cooling stage in each cycle of operation to recover FREON from the FREON-containing feed air 23. While the first adsorption tower 21 is in an adsorption stage, the second adsorption tower 22 carries out the operations of the desorption and cooling stages. While the second adsorption tower 22 is in the adsorption stage, the first tower 21 carries out the operations of the desorption and cooling stages. Therefore, the FREON gas can be continuously recovered from the exhaust air. In a case where the continuous recovery is not essential, the above-described operations of the adsorption, desorption and cooling stages may be carried out at predetermined time intervals by the use of a single adsorption tower. When the time of the adsorption stage does not conform with the combined time of the desorption and cooling stages, there may be provided three or more main adsorption towers. For example, in case of a system employing three main adsorption towers, the operations of the adsorption, desorption and cooling stages are carried out separately by the respective towers. In a three-tower system, however, the adsorption tower in the cooling stage has to waste time as the cooling stage needs a shorter time than other stages. On the other hand, in case of a four-tower system, it is advisable to use two adsorption towers for carrying out the desorption stage which takes the longest time, thereby to reduce the amounts of the adsorbent material in the respective towers and to shorten the time of the desorption stage. This permits to determine the timing of switching the operations of the respective adsorption towers on the basis of the cooling stage which requires the shortest time.

Figure 5:
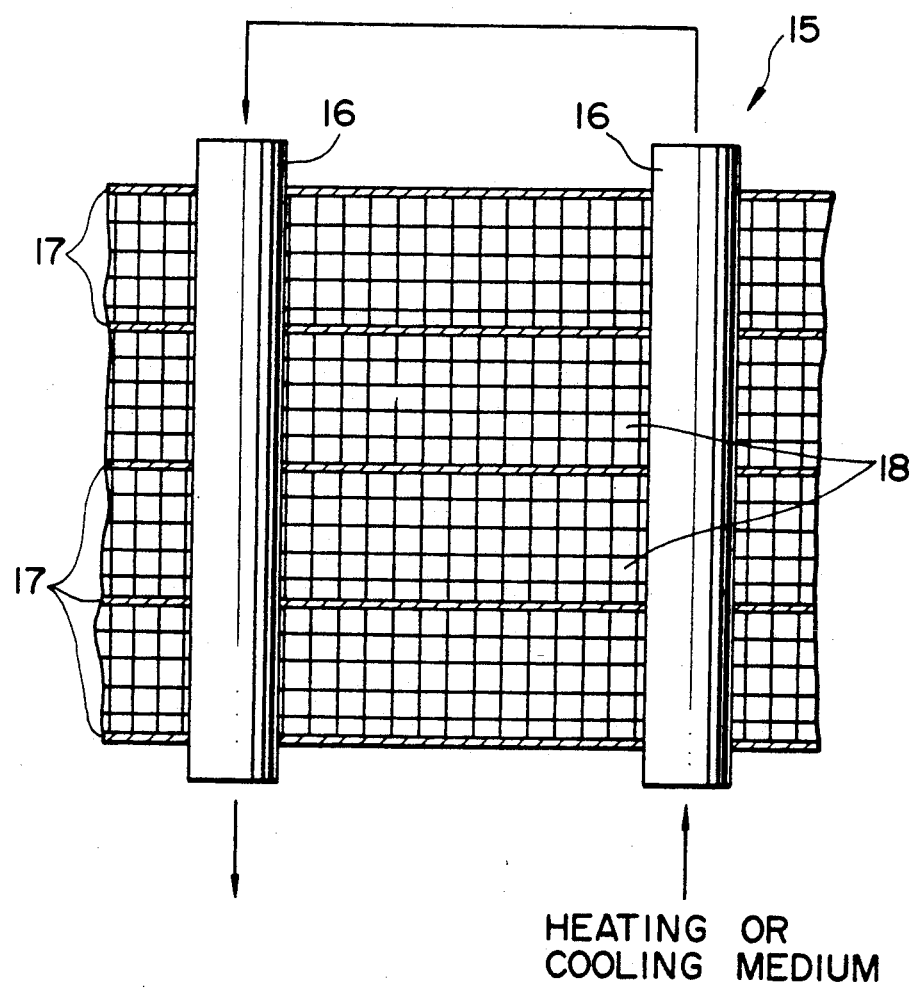
FIG. 5 is a schematic view of a solvent adsorbent employed in the second embodiment of the invention.

Shown in a schematic sectional view in FIG. 5 is a heat exchanger type solvent adsorber 15 employed in the second embodiment of the invention. More specifically, the solvent adsorber 15 is constituted by a large number of fins 17 which are fitted around a plural number of pipes 16 providing passages for circulating selectively a heating or cooling medium. These fins 17 are positioned in parallel spaced relation with each other and fixedly bonded to the pipes 16. Sandwiched between the fins 17 are adsorbent materials 18 of a honeycomb structure similar to the adsorbent material 2a shown in FIG. 1.

With the adsorber 15 of the above-described construction, the adsorbent material 18 is heated by circulating a heat medium through the pipes 16 which are fixedly bonded to the adsorbent material 18. Upon heating, the adsorbent material 18 releases the FREON. On the other hand, upon circulating a cooling medium through the pipes 16, the fins 17 and the adsorbent material 18 in contact with the fins 17 are cooled off to a temperature range where the adsorbent regains an excellent adsorptive action.

When the solvent adsorber 15 of FIG. 5 is applied to the solvent recovery system of FIG. 4, the blower 27a and valves 30 and 31 can be omitted in the cooling stage of the system since the adsorber 15 itself has the cooling function.

Figure 6:
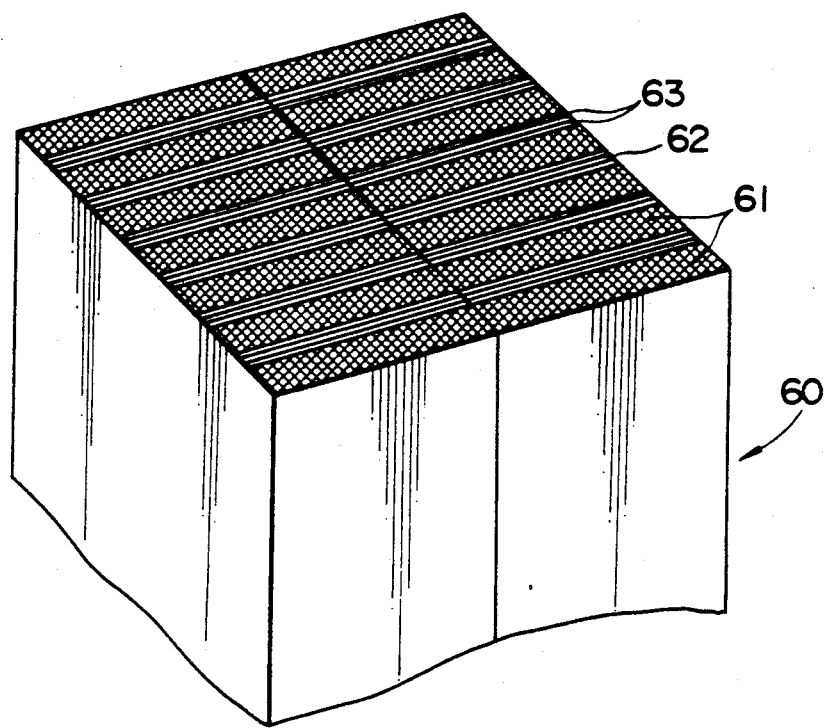
FIG. 6 is a schematic perspective view of a solvent adsorbent employed in a third preferred embodiment of the invention.
Figure 7:
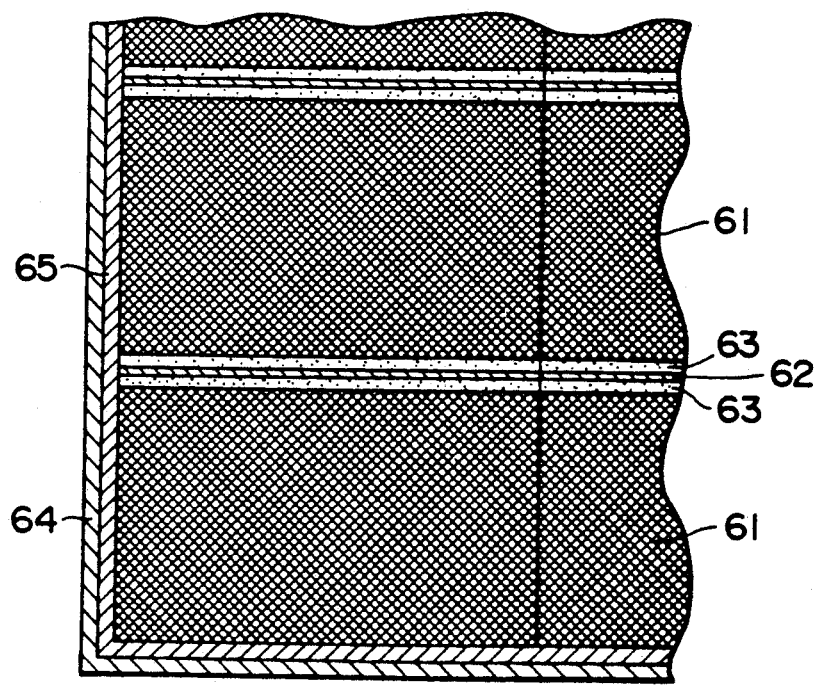
FIG. 7 is an enlarged plan view of part of the adsorbent shown in FIG. 6.

Referring now to FIGS. 6 and 7, there is illustrated an adsorber 60 which is employed in the third embodiment of the invention, showing the adsorber in a perspective view in FIG. 6 and in an enlarged fragmentary cross-sectional view in FIG. 7. In this embodiment, the adsorber 60 is constituted by two rows of adsorbent material, each row being composed of seven adsorbent units of honeycomb structure formed mainly of activated carbon. In each row, a laminar structure containing a sheet heater 62 and buffer layers of felt-like sheets 63 are interposed between the adjacent adsorbent units 61. Each laminar structure has a sheet heater 62 sandwiched between a pair of felt-like sheets 63. Accordingly, the sheet heater 62 is gripped on the opposite sides thereof by the honeycomb adsorbent structures through the felt-like sheets 63.

The sheet heater 62 is formed of a material which is capable of generating heat upon current conduction, while the felt-like sheets 63 are formed of a material of high heat conductivity. For example, the felt-like sheet 63 is of felted activated carbon fiber.

In this particular embodiment, the adsorbent units 61 and the laminar structures of the sheet heater 62 and felt-like sheets 63 are fitted in a rectangular frame 65 of a phenolic resin which is in turn received in an outer frame 64 of stainless steel. As a result, the laminar structure is electrically shielded by the insulating frame 65 and supported by the stainless steel frame 64 of high strength.

With this adsorber 60, the FREON-containing air or other treating gas like moistened air is passed longitudinally through the adsorber 60, adsorbing thereon FREON, moisture or other feed gas components to be removed. On the other hand, heat is generated by resistance heating upon supplying current to the sheet heaters 62, and as a result the adsorbent material 61 is heated to release the adsorbed FREON therefrom. In this instance, the felt-like sheets 63 which is formed of a material of high heat conductivity transmit the heat from the sheet heaters 62 promptly to the adsorbent material 61 without any stagnation. Accordingly, the adsorbent material 61 is heated up with excellent heat-up characteristics as soon as turning on the sheet heaters 62. The felt-like sheets 63 which are formed of activated carbon fiber are flexible and easily deformable, so that they can be kept in intimate contact with the adsorbent material 61 and sheet heater 62 to prevent the feed air passing through gap spaces between the adsorbent material 61 and sheet heater 62 instead of flowing through the adsorbent material 61. Further, the flexibility of the felt-like sheets 63 serves to absorb the tolerance in molding dimensions of the adsorbent material 61, if any, facilitating to fit the adsorbent material 61 tightly in the frames 64 and 65.

Dealt with in the following description are the results of operations in which the above-described adsorber of the invention was incorporated into a FREON recovery system for concentration of FREON-containing air and recovery of liquefied FREON. The adsorbent material 61 was provided as adsorbent units of molded structures composed mainly of activated carbon and arranged in two rows as shown in FIG. 1, stacking nine rows one on another to form an adsorber consisting of eighteen adsorbent units in total, and inserting eight sheet heaters 62 between the stacked rows, namely, inserting sixteen sheet heaters 62 in total. Similarly, sixteen sets of felt-like sheets of activated carbon were inserted in total. The adsorbent units 61 in the opposite end positions of each row had a width of 120 mm, a length of 50 mm and a thickness of 15 mm, and other adsorbent units 61 in the intermediate positions had a thickness of 30 mm. The sheet heaters 62 had a width of 120 mm, a length of 400 mm and a thickness of 1 mm. Each sheet heater 62 had a capacitance of 430 W. Further, the felt-like sheets 63 of activated carbon had a width of 120 mm, a length of 400 mm and a thickness of 3 mm. The felt-like sheets 63 were used in sets each consisting of a couple of sheets which were positioned on the opposite sides of a sheet heater 62. This adsorber 60 was placed in each adsorption tower in a twin tower type FREON recovery system as shown in FIG. 4. The heating temperature of the sheet heaters 62 in the desorption stage was controlled to 150° C., and concentrated FREON gas was drawn out under reduced pressure of about 100 Torr.

In a case where the feed air (air of low FREON concentration) with a FREON concentration of 5000 ppm was supplied to the recovery system at a flow rate of 40 Nm$^3$, the FREON concentration in the cleaned air at the outlet was smaller than 100 ppm. The high FREON concentration air (air of high FREON concentration) discharged from the adsorption tower had a FREON concentration of 530,000 ppm in average, attaining a FREON recovery rate higher than 98%.

The use of the adsorber of this embodiment resulted in an increased efficiency in elevating the adsorbent temperature, accelerating the adsorption and desorption stages.

According to the present invention, a buffer material like the felt sheet which has a high pressure loss is interposed between the sheet heater and adsorbent material, thereby preventing passage of the treating gas through the gap space between the sheet heater and adsorbent material to permit removal of gas components at an extremely high rate. Besides, the buffer material has higher heat conductivity than the adsorbent material, so that the heat of the sheet heater is promptly transmitted to the adsorbent material to elevate the temperature of the latter in a more accelerated manner as compared with the prior art sheet heaters which are bonded to an adsorbent material by the use of an adhesive. Therefore, the solvent recovery system can perform the operations of the adsorption and desorption stages more efficiently. The buffer material has a further advantage in that it facilitates the assembling process by absorbing the tolerances in dimensions of the adsorbent material if any.

Figure 8:
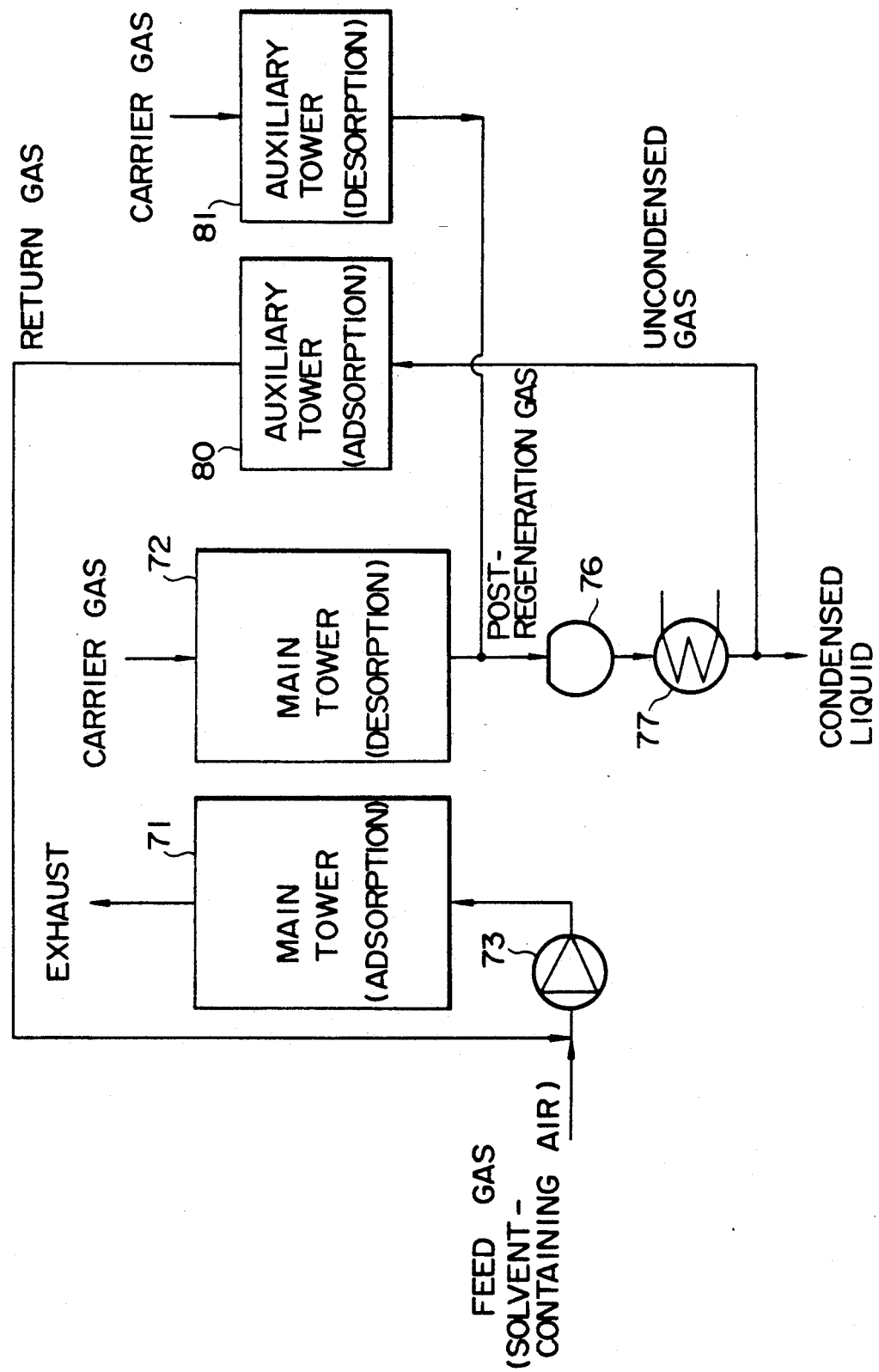
FIG. 8 is a block diagram of a solvent recovery system in the third preferred embodiment of the invention.

Referring now to FIG. 8, there is shown a block diagram which explains the principles of a solvent recovery system in the third embodiment of the invention. The solvent recovery system of this block diagram is intended for the recovery of FREONS.

Each of main adsorption towers 71 and 72 receives therein an adsorber 2 of the type as shown in FIG. 1. Similarly, the adsorbent material 2a is heated by sheet heaters 2b which generate heat upon supplying current thereto. As a result, FREON is released from the adsorbent material 2a to regenerate the material 2a. Of course, the adsorber 15 or 60 of FIG. 5 or 6 may be placed in the adsorption towers if desired. The system is further provided with auxiliary adsorption towers 80 and 81 which are filled with activated carbon pellets to remove FREONS from air which is passed through the auxiliary adsorption towers.

In the phase of operation shown in FIG. 8, the main adsorption tower 71 is in the adsorption stage while the other main adsorption tower 72 is in the desorption stage (regeneration stage). Namely, solvent-containing air is introduced into the main adsorption tower 71 by a blower 73 as a feed gas. On the other hand, a carrier gas which transfers the desorbed FREON is introduced into the main adsorption tower 72. In the desorption stage of the main tower 72, sheet heaters 2b are turned on to heat up the adsorbent material 2a in the main tower 72 by resistance heating. The carrier gas in the main tower 72 is drawn out by a vacuum pump 76 and supplied to a cooler condenser 77. Uncondensed gas from the cooler condenser 77, which contains uncondensed solvents, is supplied to the auxiliary adsorption tower 80. The uncondensed gas components are passed through the adsorbent material in the auxiliary tower 80 to remove therefrom the uncondensed solvents by secondary adsorption, and the resulting quasi-clean gas is returned to the upstream side of the blower 73. The returned gas is introduced into the main adsorption tower 71 again for adsorption of the solvent, and the resulting cleaned air is released into the atmosphere. On the other hand, the inside of the auxiliary adsorption tower 81 is evacuated by the vacuum pump 76, and the adsorbent material in the auxiliary tower 81 releases the adsorbed solvent due to the pressure reduction. The desorbed solvent is brought into the cooler condenser 77 by the carrier gas for removal of the solvent together with the post-regeneration gas from the main adsorption tower 72. Condensed solvent liquid from the condensing cooler 77 is collected in a storage tank.

At or immediately before a point in time when the adsorbent material in the main adsorption tower 71 is saturated with FREON, the operations of the main adsorption towers 71 and 72 and the auxiliary adsorption towers 80 and 81 are shifted to a desorption stage, an adsorption stage, a desorption stage and an adsorption stage, respectively. Thereafter, the operations of the adsorption and desorption stages are alternately repeated to recover the FREON from the feed gas. If desired, the adsorbent materials particularly in the main adsorption towers 71 and 72 may be positively cooled off to restore the adsorption capacity prior to the next desorption stage by providing a cooling stage between the above-described desorption and adsorption stages.

In the present invention, the post-regeneration gas with a high FREON concentration, which results from the regeneration of the adsorbent material in the main adsorption tower 72, is drawn out by the vacuum pump 76 and sent to the cooler condenser 77 to recover the FREON in liquefied form. Likewise, the high FREON concentration gas which results from the regeneration of the adsorbent material in the auxiliary adsorption tower 81 is sent to the cooler condenser 77 for condensation of the recovering gas component. Accordingly, the FREON which is contained in the uncondensed gas is removed therefrom in the auxiliary adsorption tower 80 to reduce the FREON concentration to an extremely low level before returning the gas to the inlet of the main adsorption tower 71. It follows that the main adsorption tower 71 can be used almost exclusively for the adsorption and desorption of the FREON in the feed gas which is introduced from outside the system. This means that the main adsorption towers are capable of efficiently treating the feed gas which is introduced from outside even when its FREON concentration is low, and they can be provided in a compact form.

In this connection, it is conceivable to introduce the post-regeneration gases from the main adsorption towers 71 and 72 directly into the auxiliary adsorption towers 80 and 81 to concentrate the FREON further and to supply a high FREON concentration gas to the cooler condenser 77 for recovery. However, it must be taken into consideration that the feed gas which is introduced from outside the system usually contains moisture in addition to a FREON. Therefore, for example, in a case where a feed gas with a FREON concentration of 1000 ppm is treated in the main adsorption tower 71 or 72 to concentrate the FREON into 80%, namely, into an 800 times higher concentration, for example, the moisture content of the gas is likewise concentrated. In such a case, a post-regeneration gas of high temperature and high humidity is discharged from the main adsorption towers 71 and 72 along with drops of oversaturated moisture content of the gas. If a post-regeneration gas of such high humidity were introduced into the auxiliary adsorption towers 80 and 81 as mentioned hereinbefore, the adsorbent activated carbon in the auxiliary towers 80 and 81 wetted with the moisture or droplets to such a degree as would impair its FREON adsorption capacity.

However, in the present invention, the post-regeneration gases from the main adsorption towers 72 and 71 are cooled in the cooler condenser 77 to condense and remove the FREON and moisture contents, sending uncondensed gas components including uncondensed FREON to the auxiliary adsorption towers 80 and 81. That is to say, the uncondensed gas to be supplied to the auxiliary adsorption towers 80 and 81 is dry or almost free of moisture, and therefore has no possibility of impairing the adsorption capacity of the adsorbent material by wetting the same.

In the embodiment of FIG. 8, the main adsorption towers 71 and 72 are provided with a heat source like sheet heaters $2b$ to concentrate the adsorbate on the adsorbent material $2a$ by the so-called TPSA (Temperature Pressure Swing Adsorption) process which effects the adsorption and desorption to and from the adsorbent material $2a$ by way of temperature and pressure controls. The auxiliary adsorption towers 80 and 81 concentrate the adsorbate by the so-called PSA (Pressure Swing Adsorption) process which effects the adsorption and desorption to and from the adsorbent material by way of pressure control. If desired, the adsorption and desorption in the auxiliary towers 80 and 81 may be effected by the TPSA process. However, the uncondensed gas from the cooler condenser 77 contains FREON in a relatively high concentration of about 30%. Therefore, if the concentration rate in the auxiliary adsorption towers 80 and 81 were triplefold, the post-regeneration gas to be supplied to the cooler condenser 77 from the auxiliary towers 80 and 81 would contain FREON in a concentration higher than 90%. Therefore, it suffices to employ the PSA process for the adsorption and desorption in the auxiliary towers 80 and 81.

The main adsorption towers 71 and 72 are not restricted to the above-described examples which are provided with an adsorbent material in the shape of a molded monolithic structure of activated carbon in combination with a heat supply member in the form of sheet heaters which are held in contact with the adsorbent material to supply heat thereto. For instance, the adsorbent material may be in the form of pellets. For heating an adsorbent material in the form of pellets or the like, it is preferable to employ a coil heater or the like which can heat up the adsorbent material in a non-contacting condition.

Atmospheric air may be used as the carrier gas to be introduced into the main adsorption towers 71 and 72 in a regeneration stage for transferring FREON. Alternatively, part of the cleaned air which is discharged from the main adsorption towers in an adsorption stage or the quasi-cleaned gas which is discharged from the auxiliary towers in an adsorption stage may be used for this purpose. In case atmospheric air is used as a carrier gas for the auxiliary adsorption towers, it can normalize and activate the adsorbent material to a sufficient degree. On the other hand, in case the quasi-cleaned gas which is discharged from the auxiliary adsorption towers in a desorption stage is used as a carrier gas, the amount of the return gas from the auxiliary adsorption tower 80 to the inlet of the blower 73 can be reduced to an amount corresponding to the carrier gas to the main adsorption towers 71 and 72 (e.g., 4 l/min) although there might occur a slight degree of degradation in cleanliness of regenerated activated carbon. Namely, when atmospheric air is used as a carrier gas also for the auxiliary adsorption towers 80 and 81, this carrier gas (3.5 l/min)

is added to the return gas which is fed to the inlets of the main adsorption towers. However, the supply of a carrier gas from the outlets of the auxiliary adsorption towers 80 and 81 permits to reduce the return gas to an amount which is suitable in case of a process for recovering a low boiling point solvent from a gas.

Figure 9:
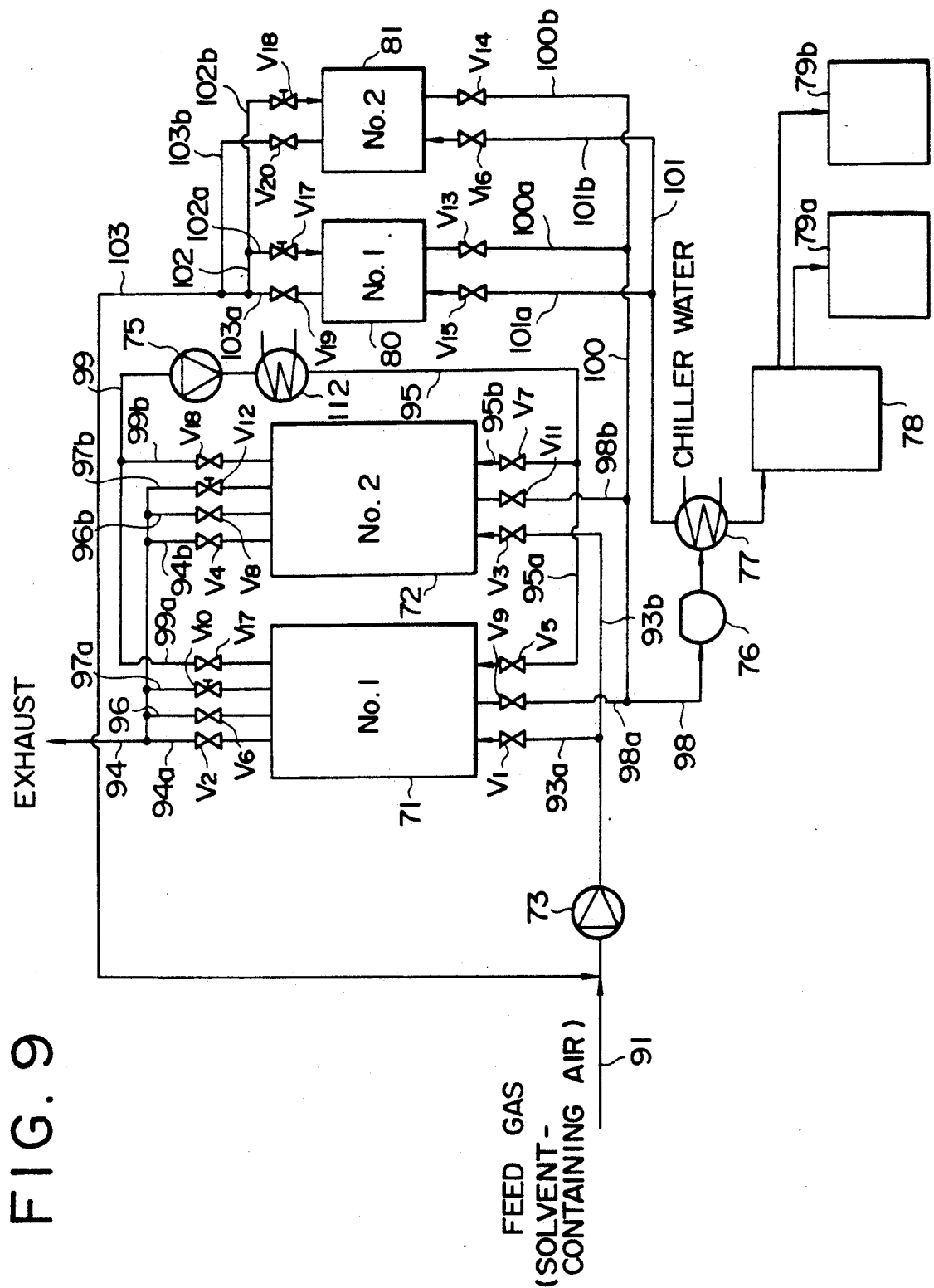
FIG. 9 is a block diagram of a solvent recovery system in a fourth preferred embodiment of the invention.

Illustrated in FIG. 9 is a FREON recovery system embodying the above-described principles of the present invention, in which the component parts common to FIG. 8 are designated by common reference numerals and their description is omitted in the following description to avoid unnecessary repetitions.

First and second main adsorption towers 71 and 72 are connected to a vacuum pump 76 respectively through branch pipes 98a and 98b of a pipe 98. The pipe 98 (98b) is connected to a pipe 100 which is in turn connected through branch pipes 100a and 100b to auxiliary adsorption towers 80 and 81, respectively. Accordingly, the first and second main adsorption towers 71 and 72 and the first and second auxiliary adsorption towers 80 and 81 are all directly connected to the vacuum pump 76. Connected in series to pipe 98 are the vacuum pump 76, cooler condenser 77 and gravitational separator 78. A coolant such as chill water of 0° C., for example, is circulated through the cooler condenser 77 thereby to cool the gas which is supplied to the condenser. The exhaust gas which is drawn out of each tower by the vacuum pump 76 is fed to the cooler condenser 77 and cooled with chill water to separate FREON and moisture contents to be sent to the separator 78, which is connected to a solvent tank 79a and a drain tank 79b. The solvent and water which are gravitationally separated in the separator 78 are recovered in the solvent tank 79a and the drain tank 79b, respectively.

The pipes 98a and 98b are provided with on-off valves $V_9$ and $V_{11}$, and the pipes 100a and 100b are provided with on-off valves $V_{13}$ and $V_{14}$, respectively.

Connected to the main adsorption towers 71 and 72 are pipes 99a and 99b which are provided with on-off valves $V_{17}$ and $V_{18}$, respectively, and joined into a pipe 99 which is connected to a cooler 112 through a cooling blower 75. A pipe 95 which is connected to the gas outlet of the cooler 112 is branched into pipes 95a and 95b which are connected respectively to the main adsorption towers 71 and 72. The pipes 95a and 95b are provided with on-off valves $V_5$ and $V_7$, respectively.

The uncondensed gas from the cooler condenser 77, which contains uncondensed FREON, is supplied to the auxiliary adsorption towers 80 and 81 through the pipe 101 and its branch pipes 101a and 101b, respectively. Further connected to the auxiliary adsorption towers 80 and 81 are one ends of pipes 103a and 103b which are connected at the other ends to a pipe 91 on the upstream side of the blower 73. These pipes 103a and 103b are provided with on-off valves $V_{19}$ and $V_{20}$, respectively. Further, a pipe 102 is connected to the auxiliary adsorption towers 80 and 81 through branch pipes 102a and 102b which are respectively provided with flow control valves $V_{17}$ and $V_{18}$. Through these pipes 102, 102a and 102b, the quasi-cleaned gas flowing through the pipe 103 is introduced into the auxiliary towers 80 and 81 after a pressure reduction by the flow control valves $V_{17}$ and $V_{18}$, respectively.

This solvent recovery system operates in the manner as follows.

Let us assume that the first and second main adsorption towers 71 and 72 are now in the adsorption and desorption stages, respectively. That is to say, the adsorber in the first main adsorption tower 71 is in activated state, while the adsorber in the second main adsorption tower 72 is saturated with or almost saturated with FREON. In this instance, the on-off valves $V_1$, $V_2$, $V_{11}$, $V_{12}$, $V_{15}$, $V_{18}$, $V_{19}$ and $V_{14}$ are open, and the on-off valves $V_5$, $V_{17}$, $V_6$, $V_9$, $V_7$, $V_{18}$, $V_3$, $V_4$, $V_8$, $V_{13}$, $V_{16}$ and $V_{20}$ are closed. The flow control valves $V_{10}$, $V_{12}$, $V_{17}$ and $V_{18}$ are adjusted such that air is passed therethrough at a predetermined flow rate for supply to the respective adsorption towers in the stage of reduced pressure. However, since the on-off valves $V_{12}$ and $V_{18}$ alone are open in such a stage, the gas is passed at a predetermined flow rate only through the flow control valves $V_{12}$ and $V_{18}$. Then the vacuum pump 76 is actuated, and the blower 73 is constantly maintained in a driven state.

Under these conditions, the FREON-containing air is sent into the first main adsorption tower 71 by the blower 73 and passed through the adsorbent material 2a of the adsorber 2 in the first adsorption tower 71 to remove FREON by adsorption. The resulting clean air is released into the atmosphere.

On the other hand, the adsorbent material 2a in the second main adsorption tower 72 is heated by turning on the sheet heaters 2b of the adsorber 21 to release FREON which was adsorbed on the adsorbent in the adsorption stage of the previous operation cycle. The second main adsorption tower 72 and the second auxiliary adsorption tower 81 are sectioned into reduced pressure condition by the vacuum pump 76, so that a small amount of cleaned air is introduced into the second main adsorption tower 72 through the flow control valve $V_{12}$, and a small amount of quasi-cleaned air is introduced into the auxiliary adsorption tower 81 through the flow control valve $V_{18}$. The FREON which has been released from the adsorbent materials in the second main adsorption tower 72 and the second auxiliary adsorption tower 81 is drawn out by the vacuum pump 76, entrained on cleaned air and quasi-cleaned air serving as a carrier gas, and sent to the cooler condenser 77. This FREON concentrated air which contains the FREON in a medium concentration is cooled in the condenser 77 to condense its FREON and moisture contents, sending the resulting liquefied FREON and water to the separator 78. The liquefied FREON is separated from water by gravitational separation, and collected in a solvent tank 79.

The air from the cooler condenser 77, which contains uncondensed FREON, is fed to the first auxiliary adsorption tower 80 through the pipes 101 and 101a, adsorbing the uncondensed FREON on the adsorbent material in the auxiliary tower 80. Further, the exhaust air from the first auxiliary adsorption tower 80 is returned to the upstream side of the blower 73 through the pipes 103a and 103, and passed through the first main adsorption tower 71 along with the raw feed air (FREON-containing air) to adsorb the residual FREON on the adsorbent material in the first main adsorption tower 71, the resulting cleaned air being released into the atmosphere.

Nextly, after sufficient desorption of the solvent from the adsorbent material, the second main adsorption tower 72 proceeds to an adsorbent cooling stage. Namely, the on-off valve $V_{11}$ is closed, and the on-off valve $C_8$ is opened to regain normal pressure in the adsorption tower 72. Thereafter, the no-off valve $V_8$ is closed again, and the on-off valves $V_7$ and $V_{18}$ are opened, actuating the cooling blower 75 and starting the operation of the cooler 102. Simultaneously, the current supply to the sheet heaters 2b of the adsorber 2 in the second main adsorption tower 72 is turned off.

As a result, the clean air which has been taken in by the cooling blower 75 through the pipes 99b, 99, 95b and 95 is circulated through the second main adsorption tower 72 as cooling air for cooling off the adsorbent material of the second main tower 72, which was heated in the previous desorption stage. Although the FREON in the second main adsorption tower 72 is entrained on the cooling air which is passed through the tower 72, the discharge cooling air from the tower 72 is fed again thereto for re-adsorption after cooling the air to an adsorbable temperature range at the cooler 102. Therefore, the entrained FREON is removed by adsorption on the adsorbent material in the second main adsorption tower 72.

Nextly, at a time point when the adsorbent material in the first adsorption tower 71 is saturated or almost saturated, the first and second main adsorption towers 71 and 72 are switched to proceed to the desorption and adsorption stages, respectively. Simultaneously, the first and second auxiliary adsorption towers 80 and 81 are switched to proceed to the desorption and adsorption stages, respectively.

Namely, the operation is shifted by closing the on-off valves $V_1$, $V_2$, $V_5$, $V_6$ and $V_{17}$, opening the on-off valve $V_9$, opening the on-off valves $V_3$ and $V_4$, closing the on-off valves $V_7$, $V_8$, $V_{11}$ and $V_{18}$, opening the on-off valve $V_{13}$, closing the on-off valve $V_{15}$ and $V_{19}$, opening the on-off valves $V_{16}$ and $V_{20}$, and closing the on-off valve $V_{14}$. Then the cooling blower 75 is deactuated, and the sheet heaters 2b of the adsorber 2 in the first main adsorption tower 71 is turned on to heat up the adsorbent material 2a, causing the adsorbent material 2a in the main adsorption tower 71 to release the FREON.

As a result, the first main adsorption tower 71 and the first auxiliary adsorption tower 80 carry out the operation of the desorption stage, while the second main adsorption tower 72 and the second auxiliary adsorption tower 81 carry out the operation of the adsorption stage. The first main adsorption tower 71 is switched to the cooling stage when the FREON has been released from the adsorbent material in the adsorption tower 71 to a sufficient degree. Namely, the operation is switched by turning off the sheet heaters 2b, closing the on-off valve $V_9$ and opening the on-off valve $V_6$ to regain normal pressure in the adsorption tower 71, and closing again the on-off valve $V_6$, followed by opening of the on-off valves $V_5$ and $V_{17}$ and actuation of the blower 75. Consequently, cleaned cold air from the cooler 102 is introduced into the first main adsorption tower 71 to cool off the adsorbent material in the tower, which was heated in the previous desorption stage.

Thereafter, the first and second main adsorption towers 71 and 72 are switched in the same manner to repeat the adsorption stage alternately with the desorption and cooling stages in such a manner that the first auxiliary adsorption tower 80 carries out the operation of the adsorption stage (or desorption stage) while the first main adsorption tower 71 is in the adsorption stage (or desorption stage), and the second auxiliary adsorption tower 81 carries out the operation of the desorption stage (or adsorption stage) while the second main adsorption tower 72 is in the desorption stage (or adsorption stage). By this operation, the FREON-containing feed air is continuously treated and turned into clean air, collecting a condensed and separated FREON liquid in the solvent tank 79a.

In this manner, a FREON is recovered in liquefied form. In this instance, except an extremely small amount of FREON which is circulated through the system, the FREON which is removed by adsorption in the main towers 71 and 72 mostly comes from the feed air which is introduced from outside. Therefore, the main adsorption towers 71 and 72 are used almost exclusively for the adsorptive treatment of the FREON-containing feed air from which the FREON should be recovered, so that they can adsorb the FREON in an extremely efficient manner by the use of a reduced amount of adsorbent material and at a lower equipment cost.

The temperature pressure swing adsorption is effected in low concentration regions of the main adsorption towers 71 and 72, while the pressure swing adsorption is effected in the high concentration regions of the auxiliary adsorption towers 80 and 81. Therefore, even in a case where the solvent concentation at the inlet is as low as 200 ppm, the solvent in the feed gas can be recovered with high efficiency in the present embodiment which, after concentration in a main adsorption tower, concentrates the uncondensed gas from the cooler condenser again in an auxiliary adsorption tower, althrough there are possibilities of the solvent being circulated through the system without condensation in the solvent recovery system of the first embodiment shown in FIG. 4. Namely, the system of this embodiment is capable of recovering a FREON with high efficiency from air with a low FREON concentration.

According to the present embodiment, the auxiliary adsorption towers are provided in addition to the main adsorption tower for the purpose of removing the solvent in uncondensed gas from the cooler condenser by adsorbing and desorbing the solvent in the uncondensed gas after the concentration of the solvent-containing gas in the main adsorption towers. Therefore, the solvent can be recovered with extremely high efficiency even when the feed gas from outside the system contains the solvent only in a low concentration. The adsorption and removal of the uncondensed solvent by the adsorbent material in the auxiliary towers increases the condensation rate of the cooler condenser and minimizes the amount of the uncondensed solvent (the solvent circulated in the system) to be removed by the main adsorption towers. Accordingly, the main adsorption towers need a reduced amount of adsorbent material, permitting a reduction in the equipment cost. Thus, the present invention, which employs adsorption towers respectively for operation on the low and high concentration sides of the system, contributes to enhance the solvent recovery efficiency while reducing the equipment cost.

What is claimed is:

1. A solvent adsorber, comprising:
   an adsorbent material containing activated carbon as a major component and molded into a monolithic structure having gas passages for passing a solvent-containing gas therethrough for adsorption of the solvent from said gas; and
   a heat supply member held in contact with said adsorbent material for transmitting heat to said monolithic adsorbent material mainly through heat conduction.
   wherein said monolithic adsorbent material comprises a plural number of honeycomb structure units, and said heat supply member is interposed between said honeycomb structure units.

2. A solvent adsorber according to claim 1, wherein said heat supply member is a sheet heater adapted to generate heat upon current conduction.

3. A solvent adsorber according to claim 1, wherein said heat supply member is a heat exchanger having a body and a heat medium circulated at least in part of the body.

4. A solvent adsorber according to claim 3, wherein said heat supply member is adapted for selectively circulating either a heating medium for raising the temperature of the heat supply member or a cooling medium for lowering the temperature of the heat supply member.

5. A solvent adsorber according to claim 1, wherein said solvent is selected from the group consisting of chlorofluorocarbon, hydrogen chlorofluorocarbon, fluorocarbon, methylene chloride, 1-1-1 trichloroethylene, perchloroethylene, trichloroethylene, toluene xylene, benzene and alcohol.

6. A solvent adsorber according to claim 1, wherein said heat supply member has a laminated structure including a sheet heater and a heat conductive buffer member having higher heat conductivity than said adsorbent material.

7. A solvent adsorber according to claim 6, wherein said heat conductive buffer member is a felt-like sheet of carbon fiber.

8. A solvent adsorber according to claims 6 or 7, wherein said monolithic adsorbent material is an activated carbon having adsorptive and desorptive actions on said solvent.

9. A solvent recovery system, comprising:
a solvent adsorber in the form of a molded monolithic structure of an adsorbent material containing activated carbon as a major component and having a heat supply member held in contact therewith for transferring heat to said monolithic adsorbent structure mainly by way of heat conduction, said monolithic adsorbent material comprising a plural number of honeycomb structure units, and said heat supply member being interposed between said honeycomb structure units;
a main adsorption tower accommodating said solvent adsorber therein;
a gas feed means for passing a solvent-containing gas through said main adsorption tower to obtain a cleaned gas by adsorption of the solvent component to said gas on said adsorbent material;
an evacuating means for evacuating said main adsorption tower to draw out a concentrated solvent gas containing the solvent desorbed from said adsorbent material;
a condensing means for cooling said concentrated solvent gas to condense the solvent in said concentrated gas; and
a control means for switching the operation of said main adsorption tower alternately between an adsorption stage for adsorbing said solvent on said adsorbent material from said solvent-containing feed gas passed through said main adsorption tower, and a desorption stage for releasing the adsorbed solvent by heating said adsorbent material through said heat supply member and evacuating said main adsorption tower by said exhaust means.

10. A solvent recovery system according to claim 9, wherein said recovery system is provided with at least two main adsorption towers, and said control means is adapted to hold said main adsorption towers alternately in said adsorption and desorption stages and to hold one adsorption tower in the adsorption stage while the other adsorption tower is in the desorption stage.

11. A solvent recovery system according to claim 10, further comprising:
first and second auxiliary adsorption towers each accommodating an adsorbent material having activated carbon as a major component; and
an uncondensed gas introducing gas introducing means for feeding an uncondensed-solvent-containing gas from said condensing means selectively to said first and second auxiliary adsorption towers;
said evacuating means being connected to said auxiliary adsorption towers to evacuate desorbed solvent gases from said auxiliary adsorption towers;
said condensing means being connected to said auxiliary adsorption towers to cool and condense the solvent component in the exhaust gas from said auxiliary adsorption towers;
said control means being adapted to switch the operation of said auxiliary adsorption towers in teh same timing as said main adsorption towers to put said auxiliary adsorption towers alternately in a desorbed solvent gas exhaust stage and an uncondensed solvent gas introducing stage, introducing said desorbed solvent gas from one auxiliary adsorption tower into said condensing means along with the exhaust gas from one main adsorption tower in a desorption stage while introducing said uncondensed solvent gas into the other auxiliary adsorption tower.

12. A solvent recovery system according to claim 11, further comprising a cooling gas circulation means adapted to cool the adsorbent material in each one of said main adsorption towers by circulation of a cooling gas and to recirculate the discharged cooling gas to said main adsorption tower after cooling.

13. A solvent recovery system according to claims 11 or 12, further comprising a gas returning means adapted to feed said uncondensed solvent gas selectively to either one of said auxiliary adsorption towers for adsorption of the uncondensed solvent on said adsorbent material and to supply a resulting quasi-cleaned gas to a gas inlet of either one of said main adsorption towers.

14. A solvent recovery system according to claims 11 or 12, wherein said solvent material in said auxiliary adsorption towers is in the form of pellets

* * * * *